June 30, 1953     H. WEHRENFENNIG     2,643,581
BAYONET UNION FOR CAMERA OBJECTIVE PARTS
Filed Jan. 18, 1951
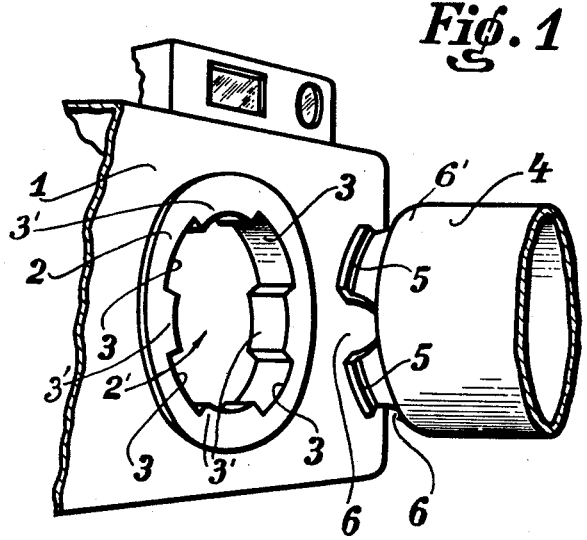
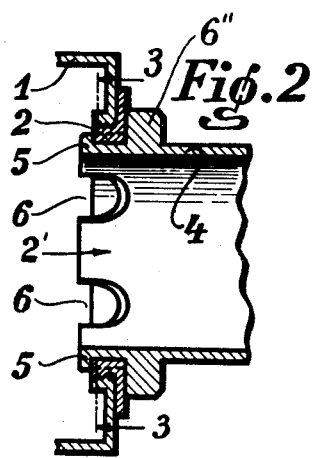 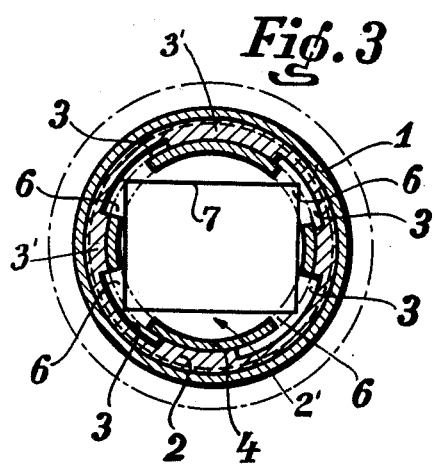
INVENTOR.
Hugo Wehrenfennig
BY Benj. T. Rauber
his attorney Patented June 30, 1953

2,643,581

UNITED STATES PATENT OFFICE 2,643,581

BAYONET UNION FOR CAMERA OBJECTIVE PARTS

Hugo Wehrenfennig, Wetzlar (Lahn), Germany, assignor to Ernst Leitz G. m. b. H., Optische Werke, Wetzlar (Lahn), Germany, a corporation of Germany Application January 18, 1951, Serial No. 206,658
In Germany February 9, 1950

3 Claims. (Cl. 88—57)

My invention relates to a bayonet union for the releasable joining of two camera parts, for example, of an exchangeable objective element with its camera housing.

Bayonet joints with two, three or four bayonet projections have been known. The dimensions of a bayonet union required for the passage of the light rays for the picture image are dependent upon the size of the image field, on the focal length, and on the light intensity of the objective to be used. With the application of large light intensity and/or long focal length, this requires relatively large light passage dimensions in the bayonet union which are not feasible for reasons of construction in every case with small image camera.

In my invention the attainment of a space saving bayonet union with relatively small light passage is made possible by arranging the bayonet slots of a four-leafed bayonet mounting ring on a camera housing at the corners of the quadrangular or rectangular image field. By this arrangement it is possible purposely to provide the tube portion carrying the bayonet overlaps with cut away spaces between the bayonet lugs so that with the use of a long focal length and/or more strongly lighted objective the rays directed to the image corners are not cut off but a complete illumination of the image field is obtained.

Through this arrangement a light inlet opening is provided in the camera wall which permits a free and unobstructed way for the light rays at the corners of the picture.

An embodiment of the invention is illustrated in the accompanying drawing in which Fig. 1 is a perspective of elements of a bayonet connection of a camera housing and an objective tube shown in disconnected, spaced, positions;

Fig. 2 is a longitudinal section through the assembled bayonet connection, and

Fig. 3 is a cross section taken on line 3—3 of Fig. 2.

In the embodiment illustrated in the drawings, a housing 1 of a camera is provided with a fastening ring 2 having an opening 2', the periphery of which is provided with four bayonet slots 3, in the given case of different size. These slots form four lugs 3', one between each adjacent pair of slots.

The objective tube 4 is provided at its end nearest the camera with four bayonet lugs 5, which correspond in size with bayonet slots 3 of the attaching ring 2. Between the bayonet lugs 5 the objective tube 4 is cut away at 6 (Fig. 1). Spaced from the lugs 5 is a shoulder 6', Fig. 1, or flange 6", Fig. 2, which abuts and seals against the outer surface of the ring 2 when the end of the objective tube is inserted into the opening 2'.

To unite the parts the bayonet lugs of the objective tube 4 are brought opposite to the bayonet slots 3 of the fastening ring 2. By pushing the objective tube 4 inwardly until the shoulder 6' or flange 6" abuts the ring 2 and finally turning it on optical axis, the camera housing 1 and objective tube 4 are united. In interlocked position, the cut out portions 6 of the objective tube 4 in each case are found opposite the bayonet slots 3 and lie together with these in the corners of the quadrangle or rectangle 7 of the image field (Figs. 2 and 3). Leakage of light from an exterior source into the cutaway portions 6 and slots 3 is prevented by the abutment of the shoulder 6' or flange 6" against the outer face of the ring 2.

Having described my invention, what I claim is:

1. Bayonet joint for the separable union of an objective with a camera which comprises a camera housing having a light receiving opening with four lugs extending into said opening and spaced to form four notches positioned at the four corners of a rectangular image field and an objective tube having four outwardly projecting lugs positioned to pass through said notches, said tube wall having cut away portions between said lugs to coincide with said notches when said tube is rotated to bring its lugs into engagement with those of said opening, said tube being sealed by a ring-like shoulder beyond said cutaway portions to said housing to prevent leakage of light to the interior of said housing.

2. The bayonet joint of claim 1 in which the depth of the cut away portions of the objective tube is sufficient to avoid interception of light rays projected in a rectangular field.

3. Bayonet joint for the separable union of an objective with a camera which comprises a camera housing having a light receiving opening with four lugs extending into said opening and spaced to form four notches positioned at the four corners of a rectangular light passage and an objective tube having an end portion to extend through the space within the inner ends of said lugs and having four outwardly projecting lugs positioned to pass through said notches, said tube having a portion extending radially outwardly to and sealing against the outer face of said housing about said opening and having cut away portions between said lugs of said tube and between the radially outwardly extending portion and the inner end of said tube to coincide with the notches of said housing when said tube is rotated to bring its lugs into overlapping engagement with those of the housing.

HUGO WEHRENFENNIG.

References Cited in the file of this patent

UNITED STATES PATENTS

| Number | Name | Date |
|---|---|---|
| 1,971,434 | Trautmann | Aug. 28, 1934 |
| 2,110,477 | Wittel | Mar. 8, 1938 |
| 2,136,149 | Nuchterlein | Nov. 8, 1938 |
| 2,260,991 | Gorey | Oct. 28, 1941 |
| 2,496,928 | Bing et al. | Feb. 7, 1950 |

FOREIGN PATENTS

| Number | Country | Date |
|---|---|---|
| 496,361 | Germany | Apr. 24, 1930 |
| 711,012 | Germany | Sept. 25, 1941 |